R. L. CLARK.
ATTACHMENT FOR PERAMBULATORS.
APPLICATION FILED OCT. 2, 1913.
1,095,381. Patented May 5, 1914.
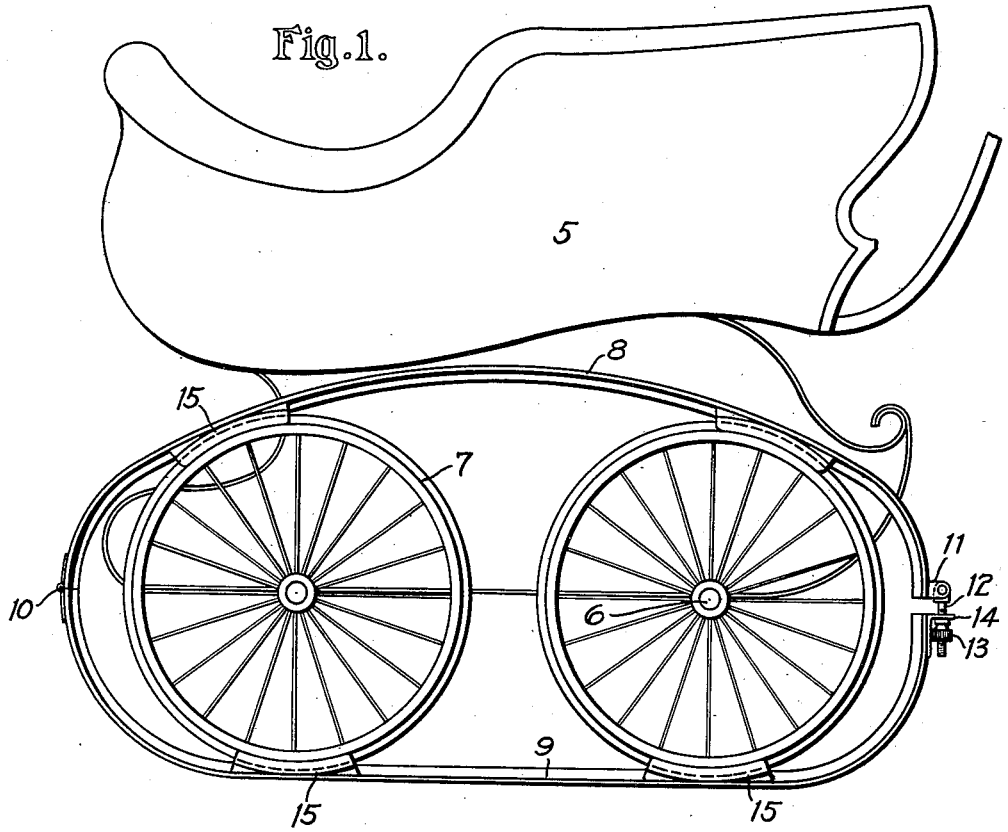
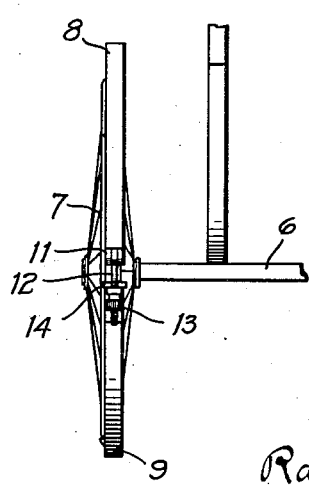
Witnesses:
Clarence W. Carroll
D. Gurnee.
Inventor:
Raymond L. Clark
by his attorneys
Davis & Dorsey

UNITED STATES PATENT OFFICE.

RAYMOND L. CLARK, OF ROCHESTER, NEW YORK, ASSIGNOR OF ONE-HALF TO HARRIS N. JOFFE, OF ROCHESTER, NEW YORK.

ATTACHMENT FOR PERAMBULATORS.

1,095,381. Specification of Letters Patent. Patented May 5, 1914.

Application filed October 2, 1913. Serial No. 793,054.

*To all whom it may concern:*

Be it known that I, RAYMOND L. CLARK, a citizen of the United States, and resident of Rochester, in the county of Monroe and State of New York, have invented certain new and useful Improvements in Attachments for Perambulators, of which the following is a specification.

This invention relates to an attachment whereby a perambulator of any of the forms commonly designated as baby-carriages, go-carts, or the like, may be readily converted, from a wheeled vehicle, into a sleigh or a cradle, thus adapting the perambulator for use in different manners.

In my pending application for Letters Patent of the United States, filed September 2, 1913, Serial No. 787,762, I have disclosed an attachment of the type in question, and in said application I have disclosed, as a preferred embodiment of the invention, an arrangement in which the attachment was substituted for the wheels of the perambulator, being applied directly to the axles of the vehicle.

The present invention relates particularly to an arrangement by which the attachment is adapted for use without removing the wheels from the perambulator, the device in its present form being clamped upon the wheel-rims so as to secure it in operative position with one of its members downwardly disposed beneath the wheels.

In the accompanying drawings:—Figure 1 is a side-elevation of an attachment embodying the present invention, together with a perambulator to which it is applied; and Fig. 2 is a partial end-view, looking from right to left in Fig. 1, and showing the attachment together with adjacent portions of the running-gear of the perambulator.

My invention is applicable to perambulators of various forms, but it is illustrated as used in connection with a baby-carriage having the usual body 5, axles 6, and wheels 7. The attachment comprises two bars 8 and 9, which lie in the same plane, and have their ends bent toward each other so that they may be connected together. These bars are preferably made of angle-iron, and the bar 8 is curved to the form of a rocker, while the bar 9 is straight throughout the greater part of its length, so that it is adapted for use as a sleigh-runner. The forward ends of the bars are connected by a hinge-joint 10, while the rear end of the bar 8 is provided with a cleft lug 11, in which is pivoted a connecting-screw 12, provided with a thumb-nut 13. The rear end of the bar 9 is provided with a cleft lug 14, which receives the screw 12, and against which the thumb-nut 13 may be screwed so as to draw the bars together. Each of the bars is provided with two recessed seats 15, adapted to receive the rims of the wheels 7, and these seats are shown as comprising separate members which may be riveted or otherwise secured to the angle-iron of which the bars are made.

To apply the attachment to the perambulator the screw 12 is first swung out of engagement with the lug 14, whereupon the bars may be swung apart about the joint 10 to permit them to be applied conveniently to the wheels of the perambulator. The screw 12 is then engaged with the lug 14, and the nut 13 is tightened to draw the bars together and clamp the wheels firmly between the seats 15. With the attachment in the position shown in the drawings it converts the perambulator into a sleigh, but when it is desired to use it as a cradle it is necessary merely to remove the attachment and invert it, thereby bringing the bar 8 into position below the wheels, whereupon it may be used as a rocker. It will, of course, be understood that a pair of attachments is used, one on each side of the perambulator.

My invention is not limited to the embodiment thereof hereinbefore described and illustrated in the accompanying drawings, but it may be embodied in various other forms within the nature of the invention, as it is defined in the following claims.

I claim:—

1. An attachment for a perambulator comprising two bars connected together and lying in the same plane, the bars having, respectively, the form of a rocker and of a sleigh-runner, and means for clamping the bars to the rims of the perambulator-wheels, with either the rocker or the runner beneath the wheels in position for use.

2. An attachment for a perambulator comprising an upper bar and a lower bar lying in the same plane and connected together, at their ends, so as to form a continuous member of ovoid form, each bar being provided with recessed seats to receive the rims of the perambulator-wheels and secure the attachment thereon.

RAYMOND L. CLARK.

Witnesses:
C. S. DAVIS,
D. GURNEE.